United States Patent
Houjou

(10) Patent No.: US 9,429,430 B2
(45) Date of Patent: Aug. 30, 2016

(54) COURSE CREATION SUPPORT APPARATUS, COMPUTER READABLE STORAGE MEDIUM, COURSE CREATION SUPPORT METHOD, AND COURSE CREATION SUPPORT SYSTEM

(71) Applicant: CASIO COMPUTER CO., LTD., Tokyo (JP)

(72) Inventor: Yoshiharu Houjou, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 27 days.

(21) Appl. No.: 13/947,898

(22) Filed: Jul. 22, 2013

(65) Prior Publication Data

US 2014/0067264 A1    Mar. 6, 2014

(30) Foreign Application Priority Data

Aug. 30, 2012    (JP) .................................. 2012-189736

(51) Int. Cl.
    *G01C 21/00* (2006.01)
    *G01C 21/34* (2006.01)

(52) U.S. Cl.
    CPC ............. *G01C 21/00* (2013.01); *G01C 21/343* (2013.01)

(58) Field of Classification Search
    CPC ............................ G01C 21/00; G01C 21/343
    USPC ......... 701/409–413, 526–527, 529, 533–534
    See application file for complete search history.

(56) References Cited

U.S. PATENT DOCUMENTS

| 2008/0194268 A1* | 8/2008 | Koch .................... H04L 67/22 455/456.1 |
| 2012/0136566 A1 | 5/2012 | Bamba |
| 2013/0166049 A1* | 6/2013 | Werner et al. ................. 700/91 |

FOREIGN PATENT DOCUMENTS

| JP | 2010088886 A | 4/2010 |
| JP | 2011-120740 A | 6/2011 |
| JP | 2011120740 A * | 6/2011 |
| JP | 2012052876 A | 3/2012 |
| JP | 2012-117848 A | 6/2012 |

OTHER PUBLICATIONS

Japanese Office Action (and English translation thereof) dated Apr. 5, 2016, issued in counterpart Japanese Application No. 2013-087194.

* cited by examiner

*Primary Examiner* — Nga X Nguyen
(74) *Attorney, Agent, or Firm* — Holtz, Holtz & Volek PC

(57) ABSTRACT

A course creation support apparatus includes an acquisition module configured to acquire at least one of area information indicative of an area and landmark information indicative of a landmark, an identification module configured to identify a component of a circuit course based on the information acquired by the acquisition module, and a creation module configured to create a circuit course includes the component identified by the identification module.

14 Claims, 19 Drawing Sheets

COURSE CREATION SUPPORT APPARATUS, COMPUTER READABLE STORAGE MEDIUM, COURSE CREATION SUPPORT METHOD, AND COURSE CREATION SUPPORT SYSTEM

CROSS-REFERENCE TO RELATED APPLICATIONS

This application is based upon and claims the benefit of priority from prior Japanese Patent Application No. 2012-189736, filed Aug. 30, 2012, the entire contents of which are incorporated herein by reference.

BACKGROUND OF THE INVENTION

1. Field of the Invention

The present invention relates to a course creation support apparatus, a computer readable storage medium, a course creation support method, and a course creation support system that support creation of a course.

2. Description of the Related Art

A disclosed technique is known as a conventional course creation support apparatus (Jpn. Pat. Appln. KOKAI Publication No. 2011-120740). According to this technique, a program is executed on a personal computer to provide a habitual course generation module, an information acquisition module, a course search module, and a display generation module. Then, based on state information and environment information acquired by the information acquisition module, the habitual course generation module generates a habitual course for a user based on a predetermined rule. When the information acquisition module acquires the user's request, the course search module searches for one of the jogging courses stored in a jogging course database which best approximates a habitual course. The display generation module generates and presents an image displaying the searched-for jogging course to the user. Thus, the user can acquire the jogging course approximating the user's routine jogging.

BRIEF SUMMARY OF THE INVENTION

According to the present invention, a course creation support apparatus including an acquisition module configured to acquire at least one of area information indicative of an area and landmark information indicative of a landmark, an identification module configured to identify a component of a circuit course based on the information acquired by the acquisition module, and a creation module configured to create a circuit course comprising the component identified by the identification module.

DETAILED DESCRIPTION OF THE INVENTION

Embodiments of the present invention will be described below with reference to the drawings.

Figure 1:
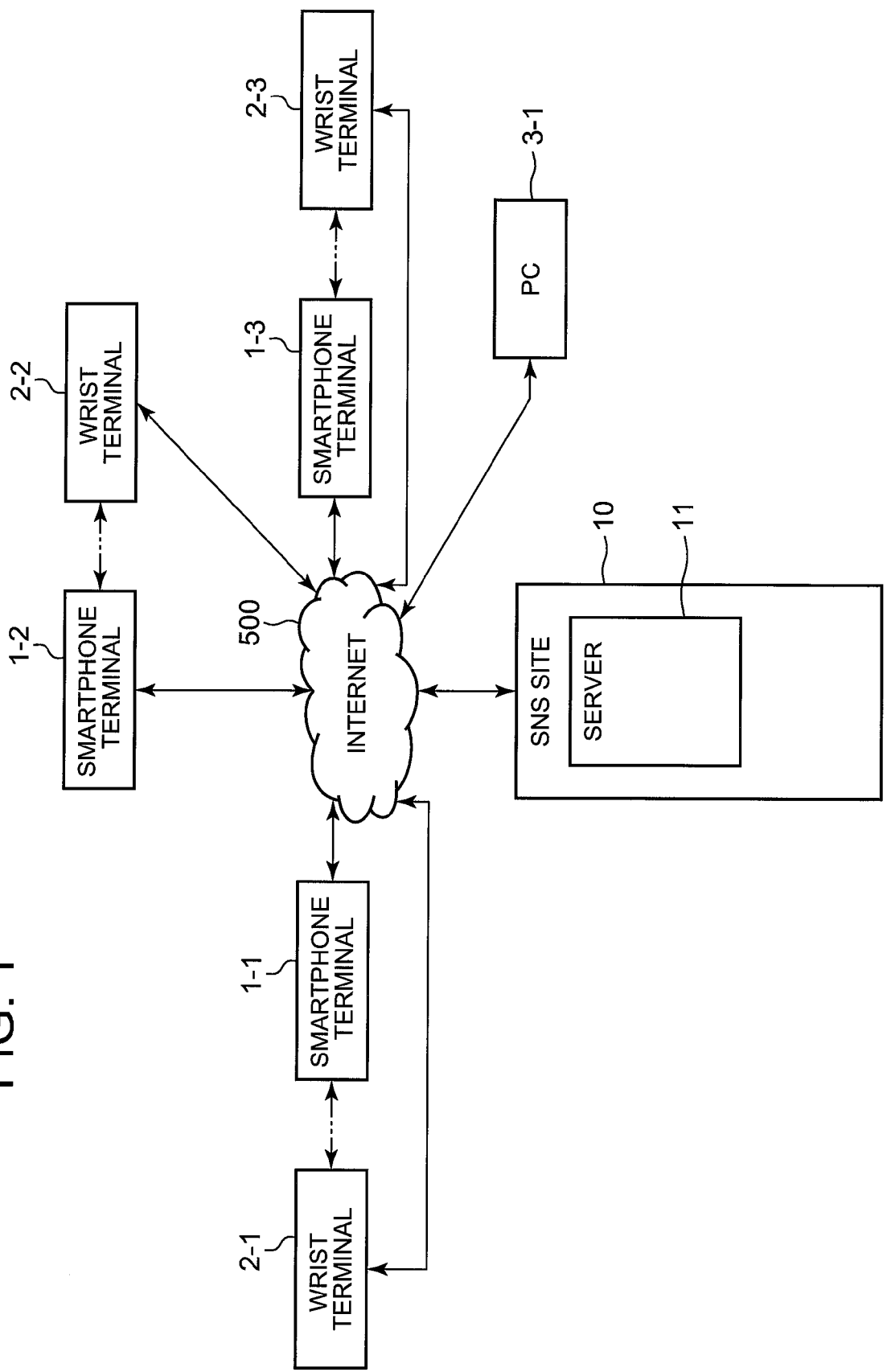
FIG. 1 is a block diagram showing a general configuration of a course creation support system according to an embodiment of the present invention.

FIG. 1 is a block diagram showing a general configuration of a course creation support system according to the present embodiment.

A social networking site (SNS) 10 including a server 11 is connected to members' smartphone terminals 1-1, 1-2, 1-3, wrist terminals 2-1, 2-2, 2-3, and a personal computer (PC) 3-1 via the Internet 500. The wrist terminals 2-1, 2-2, 2-3 are of a watch type that can be worn on the wrist. The wrist terminals 2-1, 2-2, 2-3 can also be connected by radio to the smartphone terminals 1-1, 1-2, 1-3. The number of terminals and PC is not limited to that shown in FIG. 1. An application program is installed on each of the smartphone terminals 1-1, 1-2, 1-3 so that the smartphone terminals 1-1, 1-2, 1-3 perform an operation of cooperating with the SNS 10. A relatively lightweight application program is also installed on each of the wrist terminals 2-1, 2-2, 2-3 so that the wrist terminals 2-1, 2-2, 2-3 operate to cooperate with the smartphone terminals 1-1, 1-2, 1-3. Furthermore, the wrist terminals 2-1, 2-2, 2-3 and the server 11 are directly connected together to provide a route through the wrist terminals 2-1, 2-2, 2-3 and the server 11 can exchange information without communicating with the smartphone terminals 1-1, 1-2, 1-3.

Figure 2:
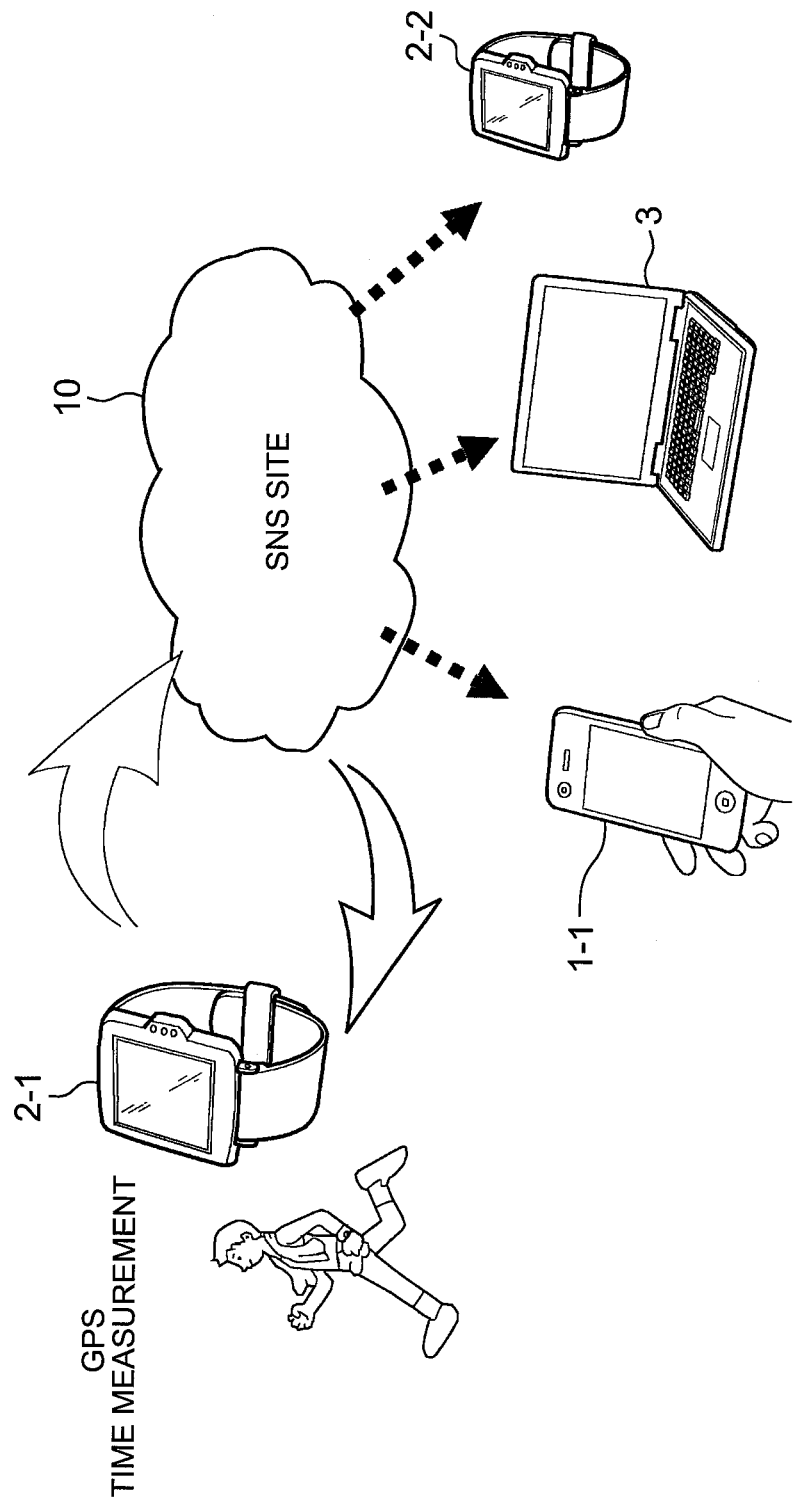
FIG. 2 is a diagram schematically illustrating the course creation support system according to the embodiment.

FIG. 2 is a diagram schematically illustrating a course creation support system according to the present embodiment. The wrist terminals 2-1 and 2-2 worn by training members, the smartphone terminal 1-1, and the PC 3 are connected together via the SNS 10. Thus, a course created by the SNS 10 can be transmitted to a member who is training with the wrist terminal 2-1 on or to another member who is training with the wrist terminal 2-2 on, or to another member's smartphone terminal 1-1 or PC 3. Cloud services may be used as the SNS 10.

Figure 3:
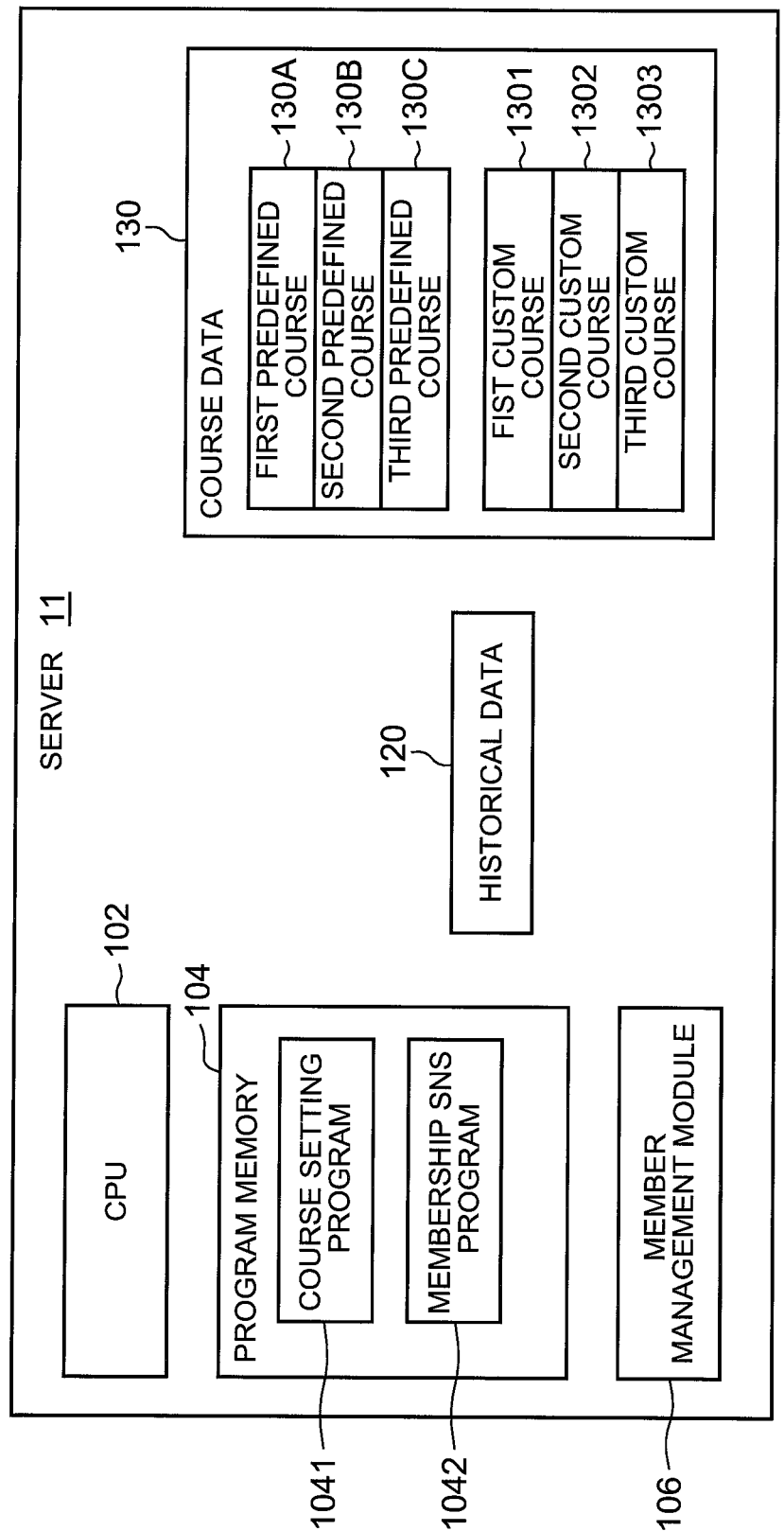
FIG. 3 is a schematic block diagram showing a configuration of a server.

FIG. 3 is a block diagram showing a general configuration of the server 11.

In FIG. 3, a CPU 102 controls the whole system. A program memory 104 stores various control programs. The CPU 102 carries out various processes by executing the programs in the program memory 104. A course setting program 1041 is a program for setting a course as described below. The course may be set by a user by tracing a course the user has actually run with the wrist terminal 2-1 on the arm or tracing on a map with the user's finger or the like. Alternatively, several landmarks may be specified to allow setting of a 5- or 10-kilometer course that circles around or passes the landmarks. Any error between an actual map and a specified course can be corrected by a well-known map matching technique.

A member management module 106 manages the members as an SNS system. The member management module 106 also manages the friendships among the members. Furthermore, profile images P1 are stored and managed for the respective members.

A history memory 120 stores a history of training so that the user can train a plurality of times and subsequently compare the results of the training with one another.

A course memory 130 stores various courses. The various courses include a plurality of existing predefined courses pre-created by the server 11, for example, a Tokyo Marathon course (first predefined course) 130A, a Honolulu Marathon course (second predefined course) 130B, an Imperial Palace jogging course (third predefined course) 130C, ... and a first custom course 1301, a second custom course 1302, a third custom course 1303, ... which are set and recorded by the user.

Figure 4:
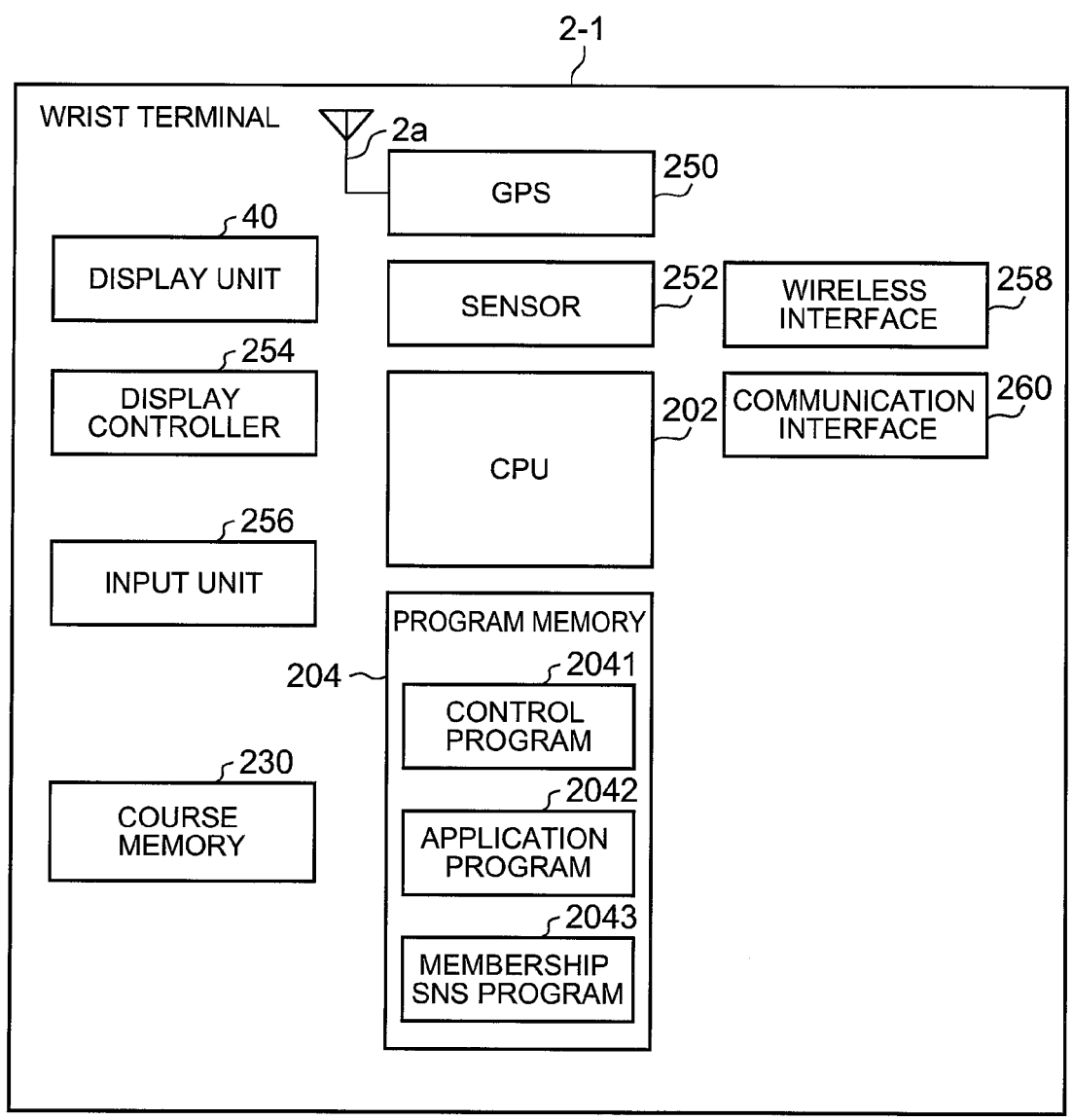
FIG. 4 is a schematic block diagram showing a configuration of a wrist terminal.

FIG. 4 is a schematic block diagram showing a configuration of the wrist terminal 2-1. The other wrist terminals are similarly configured. A display unit 40 includes an LCD and a drive circuit that drives the LCD. A display controller 254 controls a display status of the display unit 40. An input unit 256 includes various keys and switches. A course memory 230 stores various courses, for example, a plurality of courses pre-downloaded from the server 11. As is the case with course memory 130 of the server 11, for example, the Tokyo Marathon course, the Honolulu Marathon course, and the Imperial Palace jogging course may be stored in the course memory 230.

A GPS module 250 utilizes a well-known GPS (Global Positioning System) to measure the current position. That is, the GPS module 250 receives, via an antenna 2a, radio waves transmitted by a plurality of positioning satellites (GPS satellites) to acquire position data including latitude and longitude, which are indicative of the current position, and supplies the acquired position data to a CPU 202 as location information indicative of the location of the user's action. A sensor 252 includes a triaxial magnetic field sensor, a uniaxial acceleration sensor, and a uniaxial gyroscope. Thus, the advancing direction of the wrist terminal 1-1 can be measured using, in addition to the GPS module 250, the sensor 252 including the triaxial magnetic field sensor, the uniaxial acceleration sensor, and the uniaxial gyroscope. This enables a further increase in accuracy.

The CPU 202 controls the whole wrist terminal 2-1. A program memory 204 pre-stores a control program 2041, an application program 2042, and the like. The control program 2041 is a basic program that controls the whole wrist terminal. The application program 2042 is a program for cooperation with the smartphone terminal 1-1 and the server 11. The wrist terminal further includes an interface 258 for establishing a Bluetooth (registered trademark) link with a cellular terminal and an interface 260 for establishing a Wi-Fi link or the like with the server.

Figure 5:
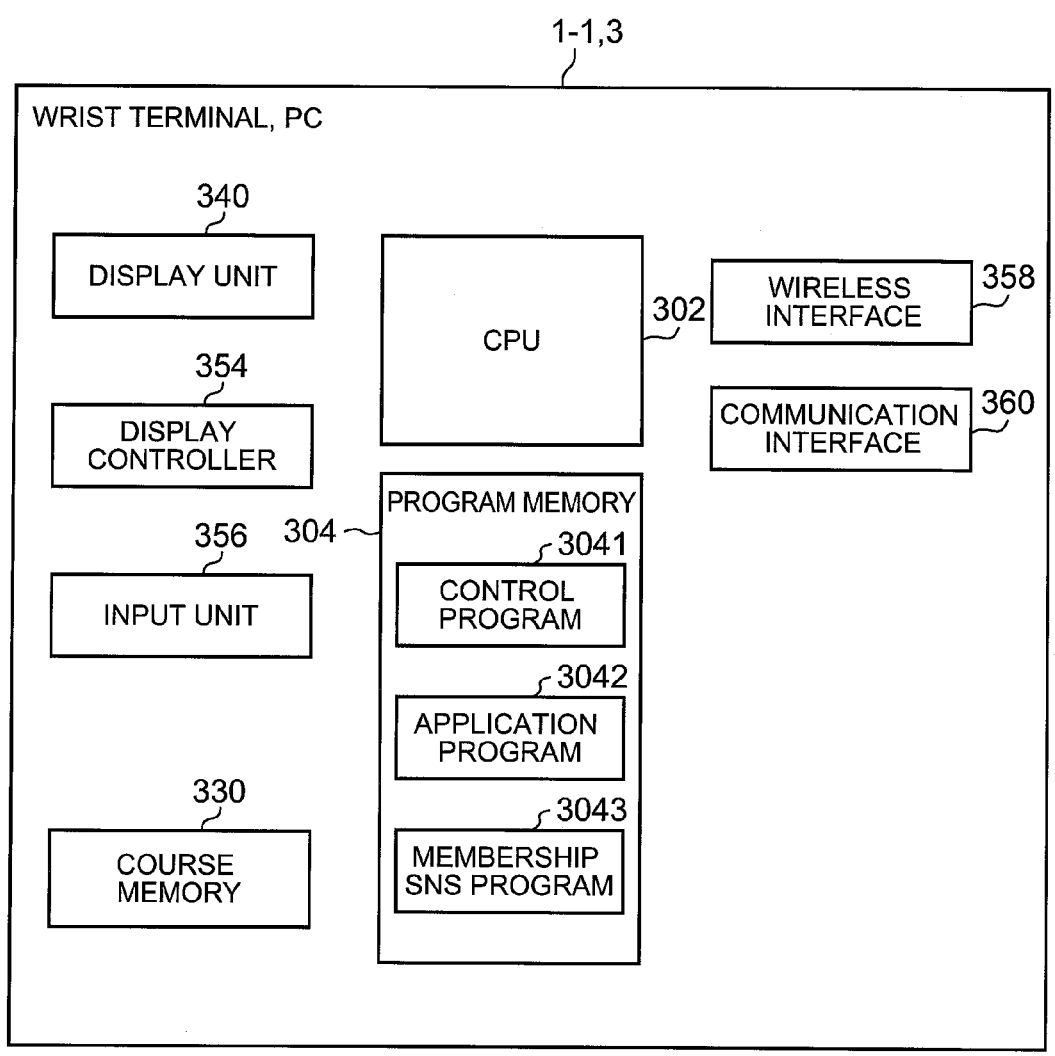
FIG. 5 is a schematic block diagram showing a configuration of a smartphone terminal or a PC.

FIG. 5 is a schematic block diagram showing a configuration of the smartphone terminal 1-1 and the PC 3. The other smartphone terminals are similarly configured. The smartphone terminal 1-1 and the PC 3 differ from the wrist terminal 2-1 only in that neither of the smartphone terminal 1-1 and the PC 3 includes the GPS module 250 or the sensor 252. The remaining parts of the smartphone terminal 1-1 and the PC 3 are similar to the corresponding parts of the wrist terminal 2-1. That is, a display unit 340 includes an LCD and a drive circuit that drives the LCD. A display controller 354 controls a display status of the display unit 340. An input unit 356 includes various keys and switches for the smartphone terminal 1-1 and includes a mouse in addition to various keys and switches for the PC 3. A course memory 330 stores various courses. The various courses include a plurality of courses pre-downloaded from the server 11.

The CPU 302 controls the whole smartphone terminal 1-1 and PC 3. A program memory 304 pre-stores a control program 3041, an application program 3042, and the like. The control program 3041 is a basic program that controls the whole smartphone terminal 1-1 and PC 3. The application program 3042 is a program for cooperation with the wrist terminal 2-1 and the server 11. The smartphone terminal further includes an interface 258 for establishing a Bluetooth (registered trademark) link with a cellular terminal and an interface 260 for establishing a Wi-Fi link or the like with the server.

(First Embodiment)

Figure 6:
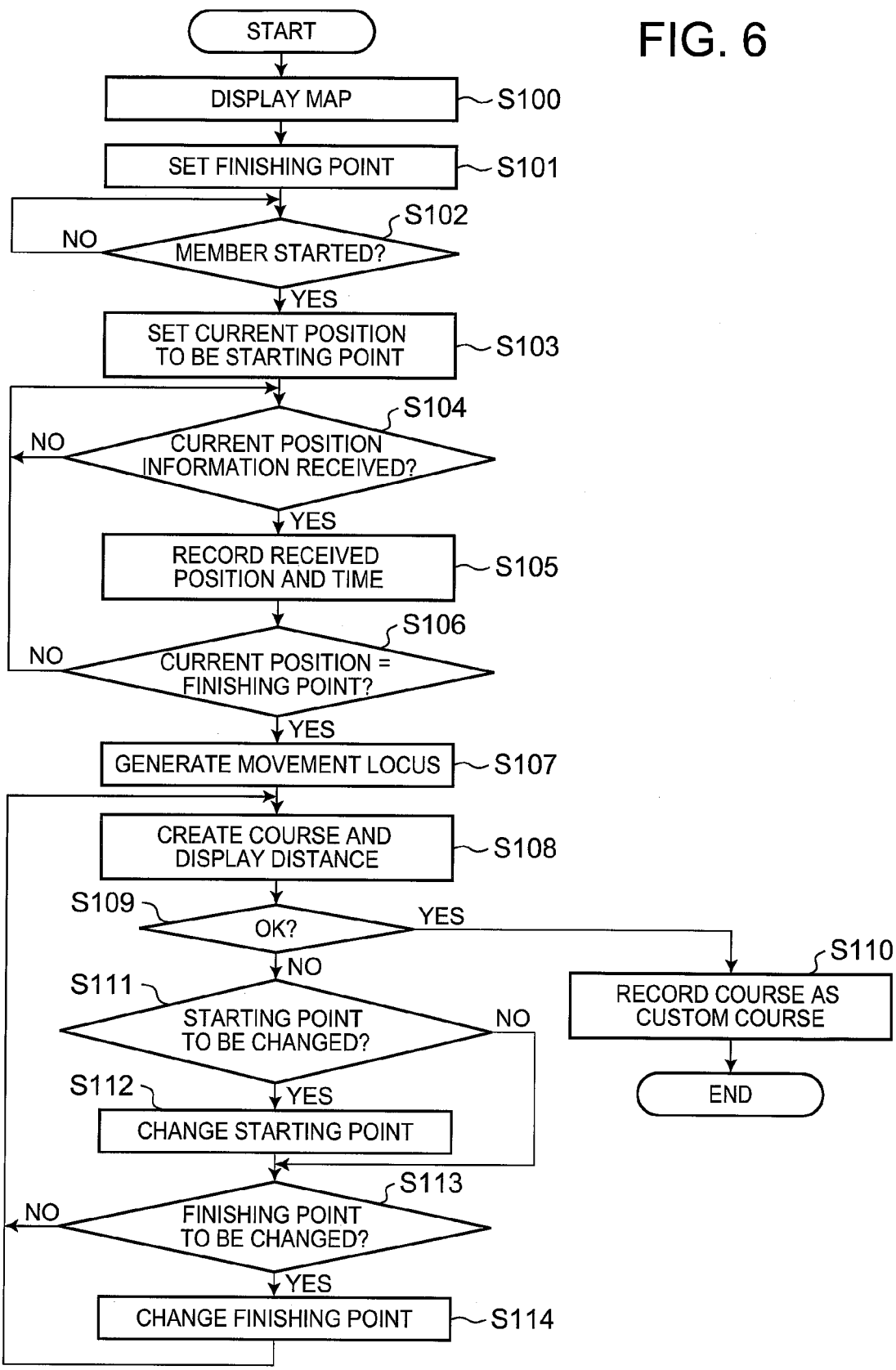
FIG. 6 is a flowchart showing a process procedure according to a first embodiment.

A first embodiment of the present invention relates to a course creation support system using the member's wrist terminal 2-1 and the server 11 of the SNS 10 which are connected together via the Internet 500. FIG. 6 is a flowchart showing a process procedure of the server 11 according to the present embodiment. In step S100, the server 11 allows the wrist terminal 2-1 to display a map on the display unit 40. The member operates the input unit 256 of the wrist terminal 2-1 to specify coordinates corresponding to a finishing point on the map displayed on the display unit 40. Then, information indicative of the finishing point is transmitted to the server 11 via the Internet 500, and the server 11 sets the finishing point for the member (step S101).

On the other hand, the wrist terminal 2-1 detects, by means of the GPS module 250, the current position at regular time intervals to transmit the current position to the server 11. The server 11 determines at step S102 whether or not the member has started running depending on whether or not the current position has changed since the setting of the finishing point. Upon determining that the member has started running, the server 11 sets the last current position received from the GPS module 250 to be a starting point (step S103).

When the member has thus started running, the server 11 checks, by the GPS module 250, whether or not the current position transmitted at the regular time intervals has been received as described above (step S104), and every time the current position is received, records the received position and the time (step S105). The server 11 also compares the received current position with the finishing point to determine whether or not the member has reached the finishing point (step S106).

If the member has reached the finishing point, the server 11 joins together the positions recorded at the regular time intervals in step S105 to generate a movement locus along which the member has run (step S107). The server 11 displays the movement locus on the map to create a course and calculates the distance of the course. The server 11 transmits the course and the distance to the wrist terminal 2-1 to allow the wrist terminal 2-1 to display the course and the distance on the display unit 40 (step S108).

Upon viewing the course and distance displayed on the display unit 40, the member operates the input unit 256 of the wrist terminal 2-1 to transmit an OK signal if the member is satisfied with the course and the distance. The server 11 determines whether or not the OK signal has been received from the member's wrist terminal 2-1 (step S109). If the OK signal has been received, the server 11 records the created course with the corresponding distance as one of the member's custom courses 1301 to 1303 (step S110).

Figure 7:
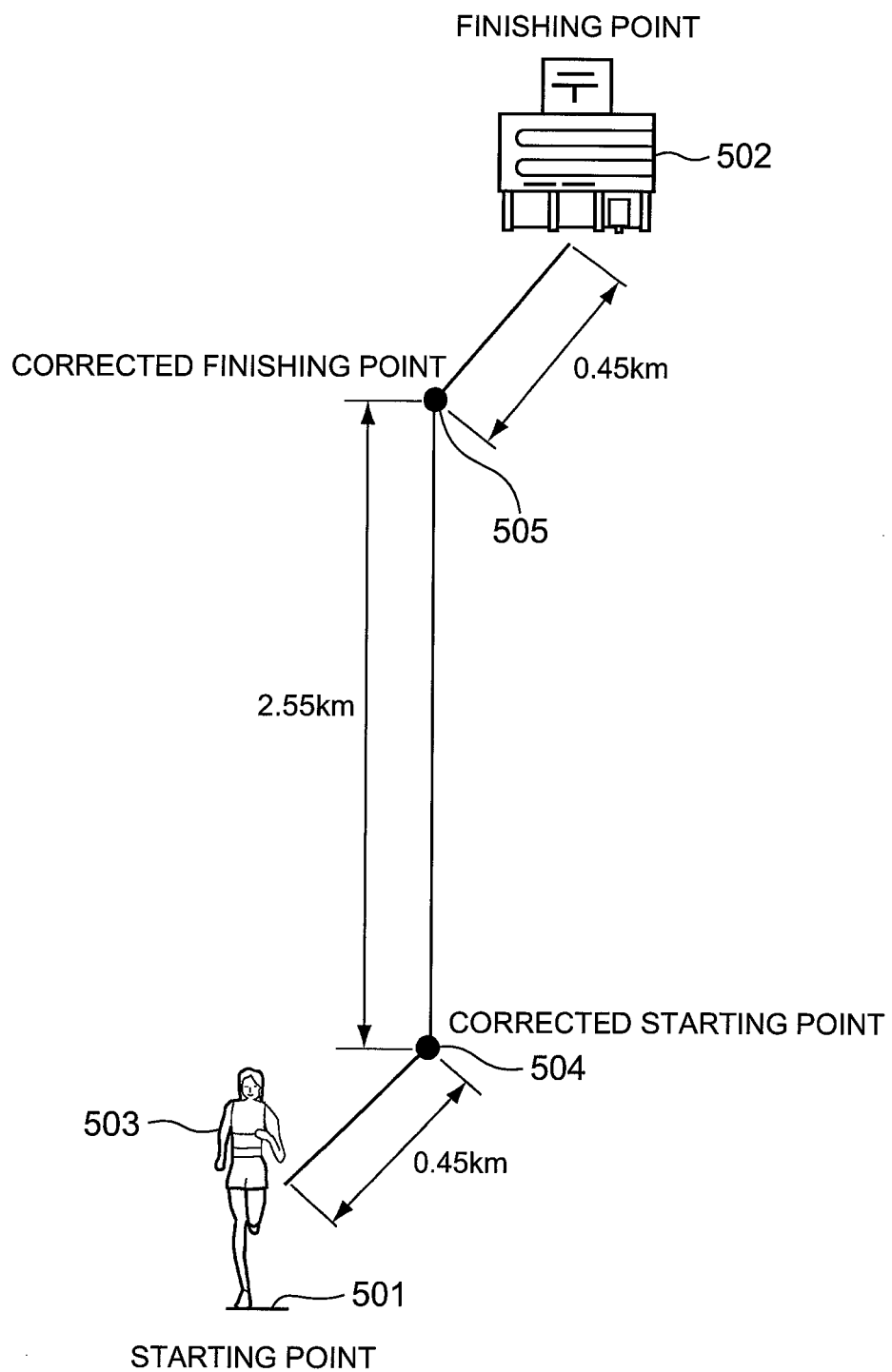
FIG. 7 is a diagram illustrating an operation according to the first embodiment.

Thus, as shown in FIG. 7, when a member 503 performs an OK operation via the wrist terminal 2-1 after running 3.45 km (0.45+2.55+0.45=3.45) from a starting point 501 to a finishing point 502, the 3.45-km course from the starting point 501 to the finishing point 502 is recorded as the member 503's custom course. FIG. 7 is a diagram conceptually showing how the course setting program 1041 of the server 11 sets a course.

The above-described course is favored by the member 503 as a result of the member's actual running and thus reflects the member 503's intension. Furthermore, what course is set for running varies among the members, and thus, the set course is one of various courses. Hence, any of the various courses which reflects the user's intension can be created.

Furthermore, if the server 11 determines in step S109 that the OK signal has not been received, the server 11 determines whether or not an instruction to change the starting point has been received from the wrist terminal 2-1 (step S111). If the instruction to change the starting point has been received, the server 11 changes the starting point in accordance with the content of the change subsequently transmitted by the wrist terminal 2-1 (step S112).

Thus, as shown in FIG. 7, when the member 503 specifies a corrected starting point 504 corresponding to a 0.45-km reduction in distance, a 3-km course from the corrected starting point 504 to the finishing point 502 is created. Furthermore, in this state, performing an OK operation allows the 3-km course from the corrected starting point 504 to the finishing point 502 to be recorded as a custom course.

In step S113 subsequent to step S112, the server 11 determines whether or not an instruction to change the finishing point has been received from the wrist terminal 2-1. If the instruction to change the finishing point has been received, the server 11 changes the finishing point in accordance with the content of the change subsequently transmitted by the wrist terminal 2-1 (step S114).

Thus, as shown in FIG. 7, when the member 503 also specifies a corrected finishing point 505 corresponding to a 0.45-km reduction in distance, a 2.55-km course from the corrected starting point 504 to the corrected finishing point 505 is created. Furthermore, in this state, performing an OK operation allows the 2.55-km course from the corrected starting point 504 to the corrected finishing point 505 to be recorded as a custom course.

That is, the present embodiment enables one of the following courses to be recorded as a custom course.

(1) 3.45-km course from the starting point 501 to the finishing point 502

(2) 3-km course from the corrected starting point 504 to the finishing point 502

(3) 3-km course from the starting point 501 to the corrected finishing point 505

(4) 2.55-km course from the corrected starting point 504 to the corrected finishing point 505

(Second Embodiment)

Figure 8:
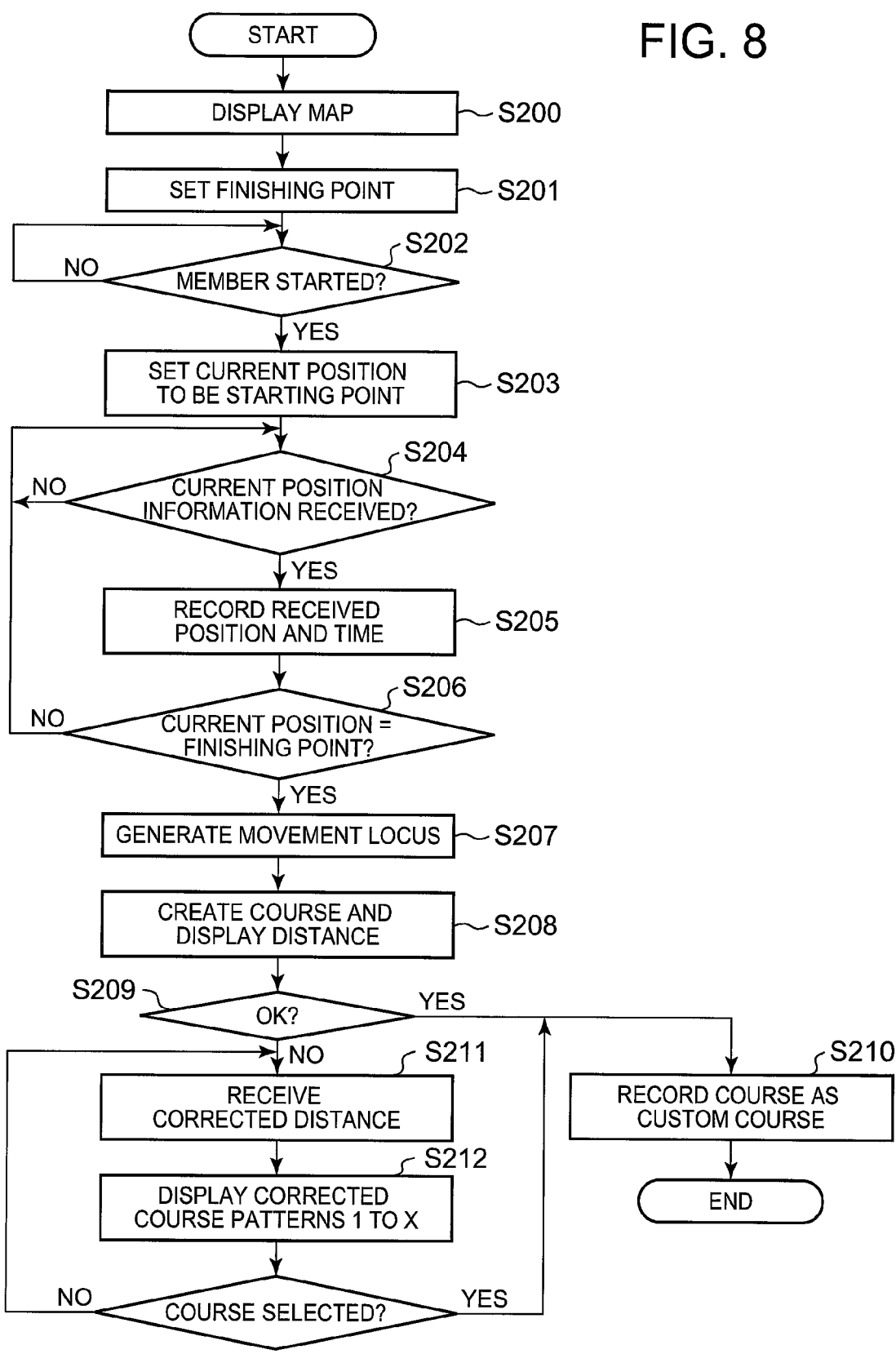
FIG. 8 is a flowchart showing a process procedure according to a second embodiment.

A second embodiment of the present invention relates to also a course creation support system using the member's wrist terminal 2-1 and the server 11 of the SNS 10 which are connected together via the Internet 500. FIG. 8 is a flowchart showing a process procedure of the server 11 according to the present embodiment. Steps S201 to S210 in this flowchart are the same as steps S101 to S110 according to the first embodiment shown in FIG. 6. If the determination in step S209 is NO and the OK signal has not been received from the wrist terminal 2-1, then the server 11 receives a subsequently transmitted corrected distance (step S211). Upon receiving the corrected distance, the server 11 creates and transmits a pattern 1 to a pattern X that are X corrected courses including the corrected distance, to the wrist terminal 2-1 so that the patterns 1 to X can be displayed on the display unit 40 (step S212).

Figure 9:
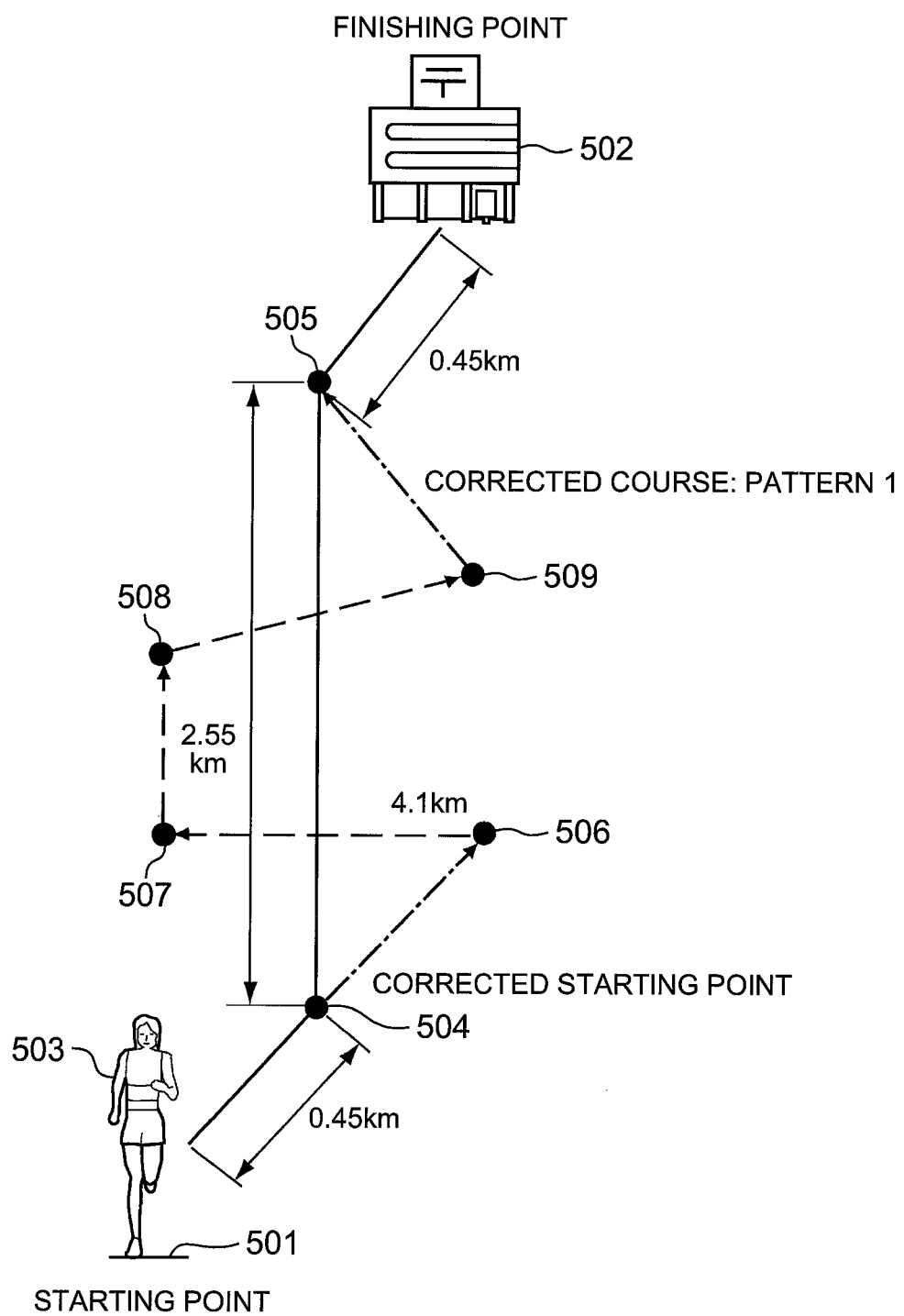
FIG. 9 is a diagram illustrating an operation according to the second embodiment.

That is, as shown in FIG. 9, it is assumed that the member 503 transmits, for example, 5 km as a corrected distance after running 3.45 km (0.45+2.55+0.45=3.45) from the starting point 501 to the finishing point 502. Then, to change the 3.45-km course into a 5-km course desired by the member, the server 11 creates a 4.1-km course shown by an illustrated dashed line and passing illustrated points in the following order: 504, 506, 507, 508, 509, 505. Moreover, the server 11 allows the display unit 40 to display a 5-km (4.1+0.45+0.45=5) corrected course: pattern 1 obtained by adding a distance of 0.45 km from the starting point 501 to the point 504 and a distance of 0.45 km from the point 505 to the finishing point 502 to the 4.1-km course passing the illustrated points in the following order: 504, 506, 507, 508, 509, 505. FIG. 9 is a diagram conceptually showing how the course setting program 1041 of the server 11 sets a course.

Furthermore, although not shown in the drawings, courses with pattern 2, . . . , and pattern X which are similarly 5 km in distance but which involve different paths are displayed on the display unit 40 in a switchable manner. Then, with one of the courses with the pattern 1, . . . , and pattern X displayed on the display unit 40, an operation of selecting this course is performed on the wrist terminal 2-1. A select signal is then transmitted from the wrist terminal 2-1 to the server 11, resulting in an affirmative determination in step S213. Hence, the server 11 advances the processing from step S213 to step S210 to record the selected corrected course as a custom course for the member.

Thus, the present embodiment allows various courses including a common actual starting point and a common actual finishing point but having a distance desired by the member and different paths to be recorded as custom courses.

(Third Embodiment)

Figure 10:
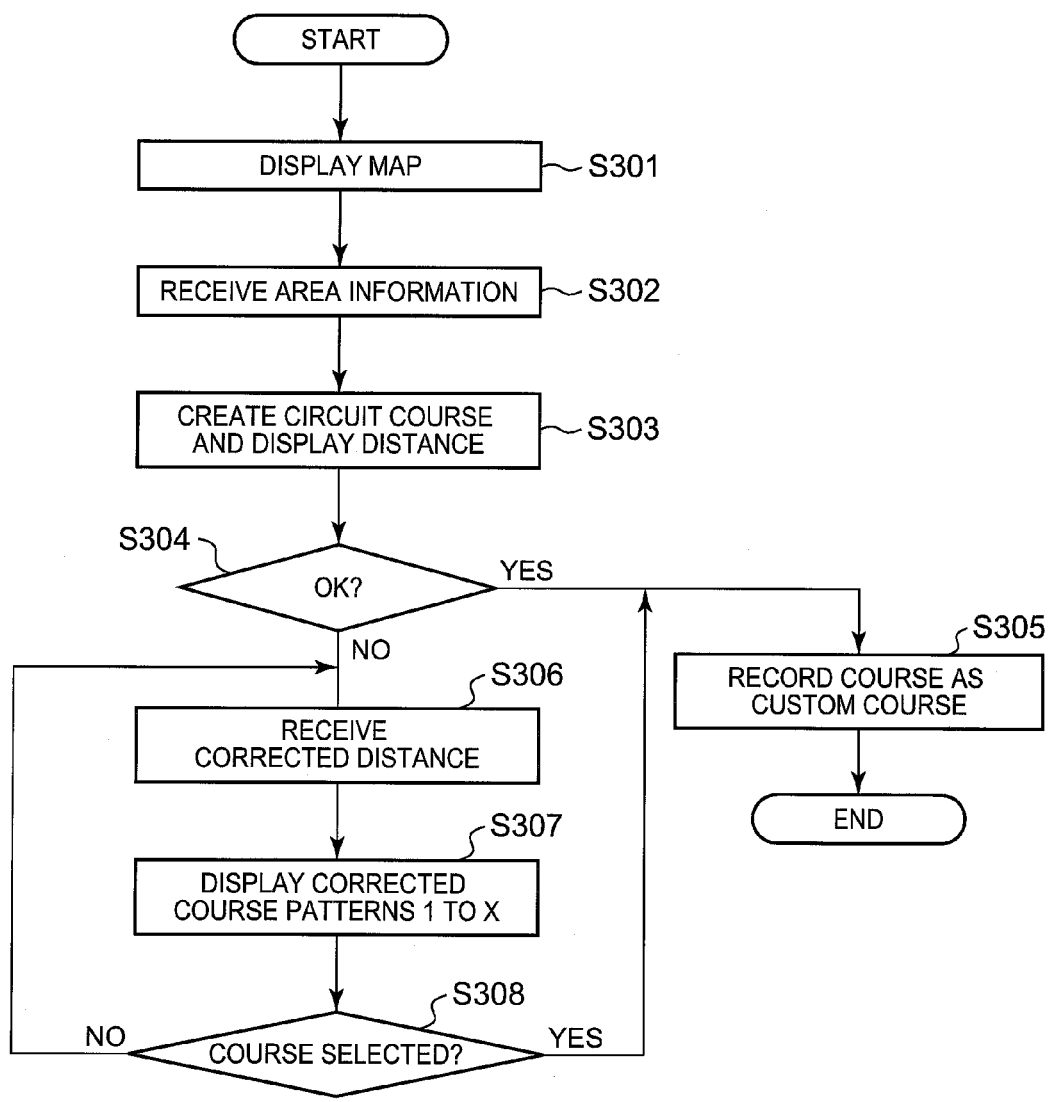
FIG. 10 is a flowchart showing a process procedure according to a third embodiment.
Figure 11:
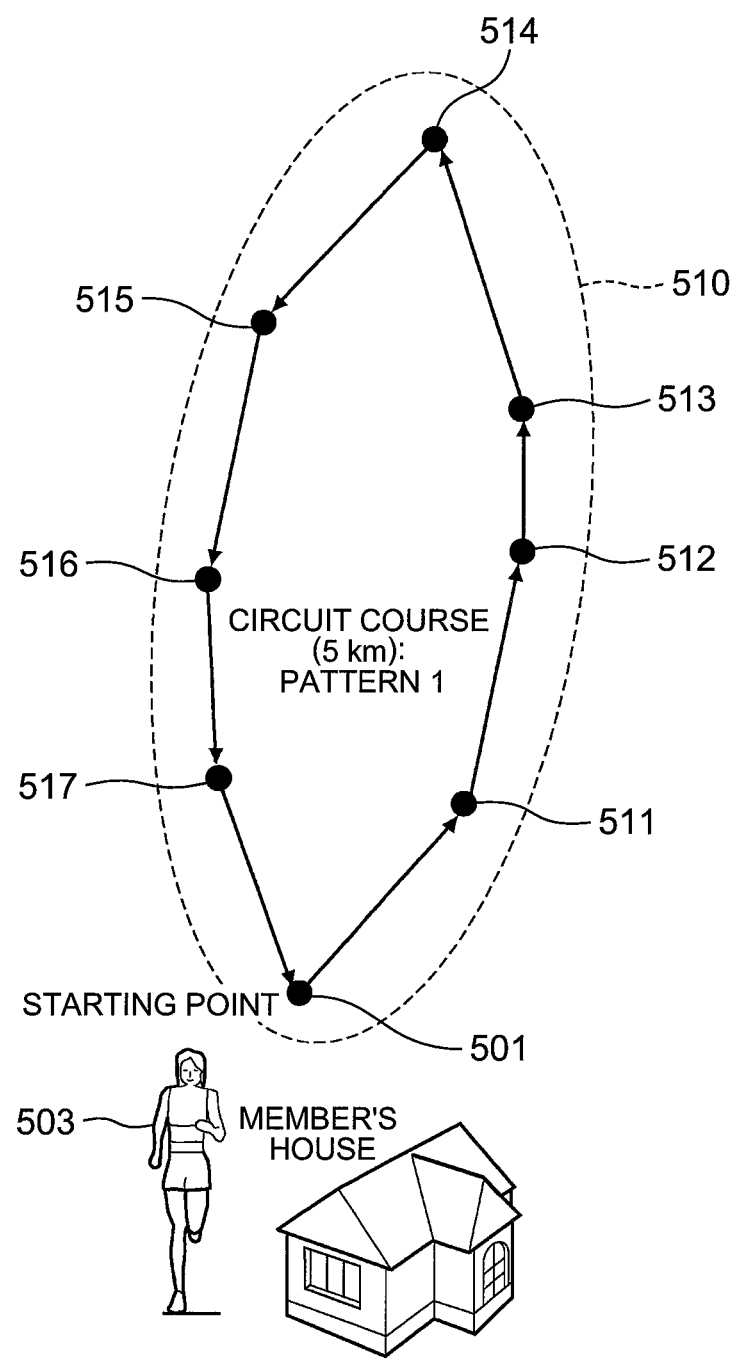
FIG. 11 is a diagram illustrating an operation according to the third embodiment.

A third embodiment of the present invention relates to a course creation support system using any of the members' wrist terminal 2-1, smartphone terminal 1-1, and PC 3 (hereinafter collectively referred to as a member terminal) and the server 11 of the SNS 10 which are connected together via the Internet 500. FIG. 10 is a flowchart showing a process procedure of the server 11 according to the present embodiment. The server 11 transmits map data in accordance with a request from the member terminal to allow the member terminal to display a map (step S301). While referencing the displayed map, the member uses the closed loop 510 to specify an area in which a circuit course is to be set as shown in FIG. 11. Then, the member terminal side transmits area information indicative of the specified area, which is received by the server 11 (step S302). FIG. 11 is a diagram conceptually showing how the course setting program 1041 of the server 11 sets a course.

Subsequently, the server 11 creates a circuit course inside the closed loop 510 and transmits the created circuit course and the corresponding distance to the member terminal to allow the member terminal to display the circuit course and the distance (step S303). Upon viewing the displayed course and distance, the member operates the input unit 256 of the wrist terminal 2-1 to transmit an OK signal if the member is satisfied with the course and the distance. The server 11 determines whether or not the OK signal has been received from the member wrist terminal 2-1 (step S304). If the OK signal has been received, the server 11 records the created course with the corresponding distance as one of custom courses 1301 to 1303 (step S305).

If the OK signal has not been received from the wrist terminal 2-1 and the determination in step S304 is NO, the server 11 receives a subsequently transmitted corrected distance (step S306). Upon receiving the corrected distance, the server 11 creates a pattern 1 to a pattern X that are X corrected circuit courses including the corrected distance, to the wrist terminal 2-1 to allow the wrist terminal 2-1 to display the patterns 1 to X on the display unit 40 (step S307).

That is, as shown in FIG. 11, if the member specifies 5 km as a corrected distance, the server 11 presents a 5-km circuit course shown by an illustrated dotted line and passing illustrated points in the following order: 501, 511, 512, 513, 514, 515, 516, 517, 501. Furthermore, although not shown in the drawings, corrected circuit courses with pattern 2, . . . , and pattern X which are similarly 5 km in distance but which involve different paths are displayed on the display unit 40 in a switchable manner. Then, with one of the corrected circuit courses with the pattern 1, . . . , and pattern X displayed on the display unit 40, an operation of selecting this course is performed on the member terminal. A select signal is then transmitted from the wrist terminal 2-1 to the server 11, resulting in an affirmative determination in step S308. Hence, the server 11 advances the processing from step S308 to step S305 to record the selected corrected circuit course as a course for the member.

Thus, the present embodiment allows recording of various circuit courses located inside the area desired by the member and having the desired distance and different paths. Of course, in this case, if such a closed loop as includes the member's house shown in FIG. 11 is set, a circuit course including the member's house can be recorded as a custom course.

(Fourth Embodiment)

Figure 12:
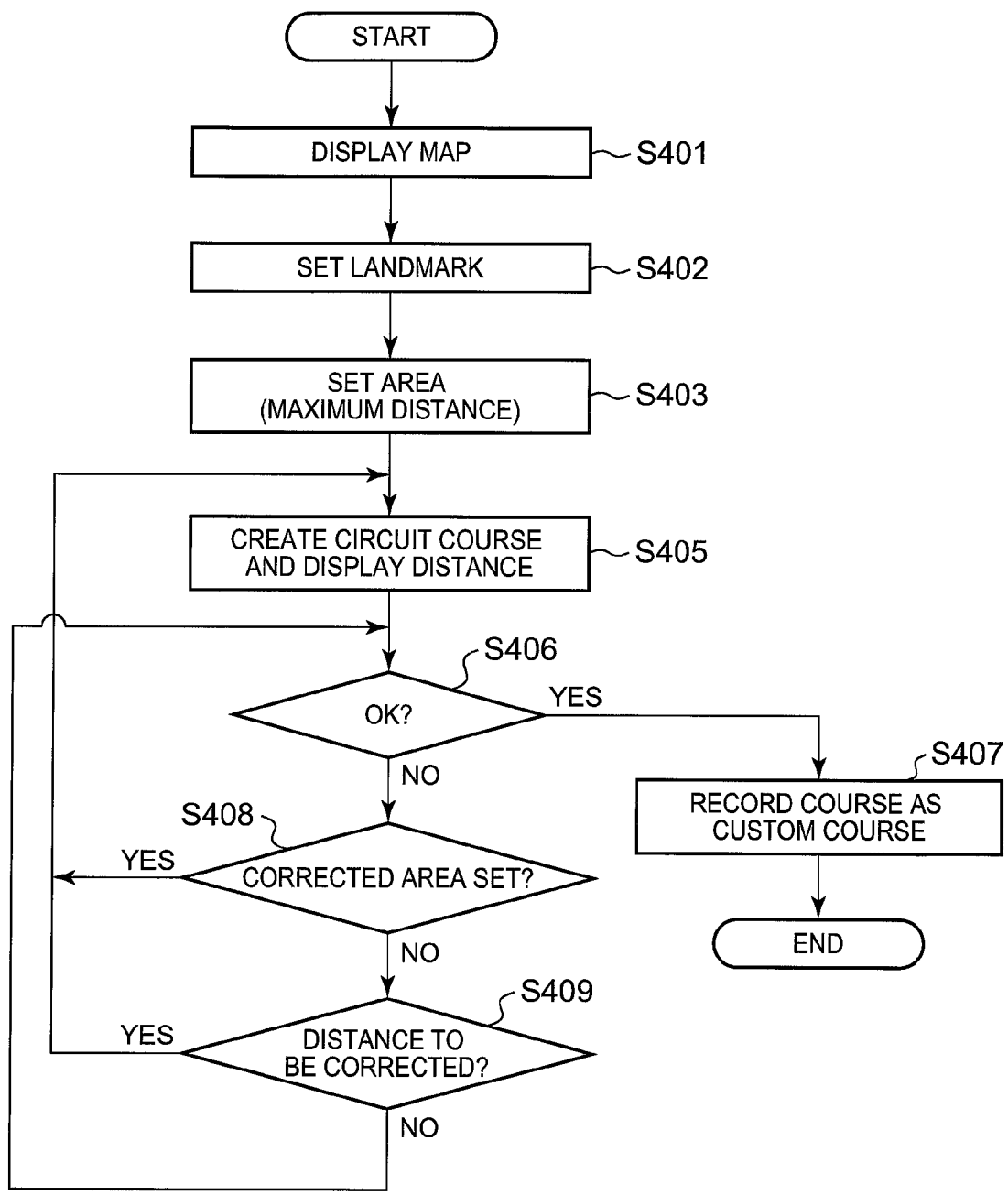
FIG. 12 is a flowchart showing a process procedure according to a fourth embodiment.
Figure 13:
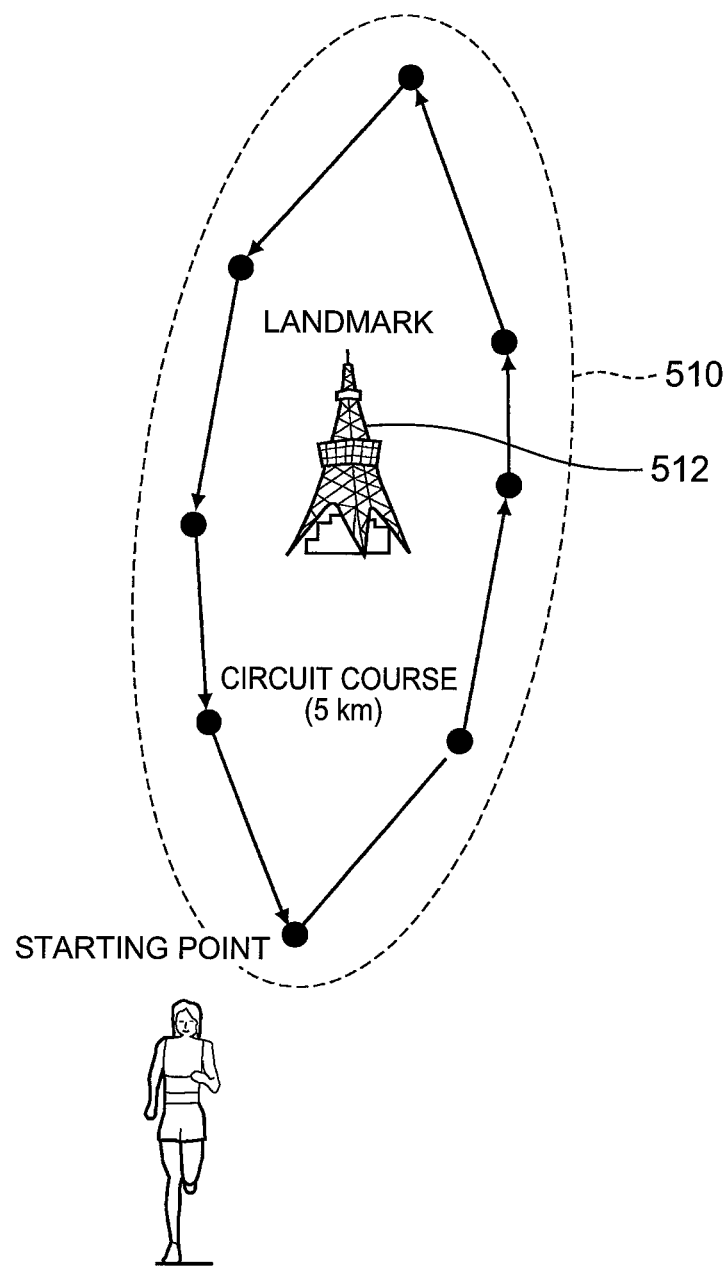
FIG. 13 is a diagram illustrating an operation according to the fourth embodiment.

A fourth embodiment of the present invention relates to a course creation support system using the member terminal and the server 11 of the SNS 10 which are connected together via the Internet 500. FIG. 12 is a flowchart showing a process procedure of the server 11 according to the present embodiment. The server 11 transmits map data in accordance with a request from the member terminal so that the member terminal can display a map (step S401). While referencing the displayed map, the member specifies a landmark 512 desired to be the center of a circuit course as shown in FIG. 13. Then, the member terminal side transmits information indicative of the landmark 512. The server 11 receives the information and sets the central landmark (step S402). FIG. 13 is a diagram conceptually showing how the course setting program 1041 of the server 11 sets a course.

Moreover, while referencing the displayed map, the member uses the closed loop 510 to specify an area in which a circuit course is to be set as shown in FIG. 13. Then, the member terminal side transmits area information indicative of the specified area. The server 11 receives the area information and sets the area (step S403).

At this time, the member terminal may transmit a maximum distance to specify the maximum distance for circuit courses to be created.

Subsequently, the server 11 creates a circuit course inside the closed loop 510 which is centered around the landmark 512 and which includes the maximum distance, and transmits the created circuit course and the corresponding distance to the member terminal for display (step S405). Upon viewing the displayed course and distance, the member operates the input unit 256 of the wrist terminal 2-1 to transmit an OK signal if the member is satisfied with the circuit course and the distance. The server 11 determines whether or not the OK signal has been received from the member wrist terminal 2-1 (step S406). If the OK signal has been received, the server 11 records the created course with the corresponding distance as one of custom courses 1301 to 1303 (step S407).

If the OK signal has not been received from the wrist terminal 2-1 and the determination in step S406 is NO, the server 11 receives subsequently transmitted information indicative of a closed loop for a corrected area (step S408). Upon receiving the information indicative of the closed loop for the corrected area, the server 11 creates a circuit course centered around the landmark 512 again, and transmits the created circuit course and the corresponding distance to the member terminal for display (step S405).

Furthermore, if no corrected area has been set and the determination in step S408 is NO, the server 11 receives subsequently transmitted information indicative of a corrected distance (step S409). Upon receiving the information indicative of the corrected distance, the server 11 creates a circuit course including the corrected distance and centered around the landmark 512 again, and transmits the created circuit course and the corresponding distance to the member terminal for display (step S405). Upon receiving the OK signal, the server 11 records the created course with the corresponding distance as one of custom courses 1301 to 1303 (step S407).

Thus, the present embodiment allows a member's desired circuit course to be selected from a plurality of circuit courses centered around a landmark desired by the member and having different paths and distances so that the selected circuit course can be recorded.

(Modification of the Fourth Embodiment)

In a modification of the fourth embodiment of the present invention, steps S401 and S402 in the flowchart in FIG. 12 are performed.

Subsequently, the member further specifies the distance or duration of the circuit course. Then, the member terminal side transmits information on the specified distance or duration, and the server 11 receives and sets the distance or the duration.

The server 11 subsequently creates a circuit course centered around the landmark and including the specified distance or duration, and transmits the created circuit course and the distance to the member terminal for display.

That is, if the distance is specified, a course circling the landmark and having the specified distance is calculated and created on the map. Thus, for example, a 10- or 20-km course circling the landmark can be created.

Furthermore, if the duration is specified, a course circling the landmark and having the specified duration is calculated and created on the map so that when the user moves at an average speed or a specified speed or a speed suitable for the user, the movement takes the specified duration. Thus, for example, a 30-minute or one-hour course circling the landmark can be created.

For adjustment of the distance or duration, the same path may be taken a plurality of times or a turn may be included in the course.

Upon viewing the displayed course and distance, the member operates the input unit 256 of the wrist terminal 2-1 to transmit an OK signal if the member is satisfied with the circuit course and the distance. The server 11 determines whether or not the OK signal has been received from the member wrist terminal 2-1. Upon receiving the OK signal, the server 11 records the created course with the corresponding distance as one of custom courses 1301 to 1303.

If the OK signal has not been received from the wrist terminal 2-1 and the determination is NO, the server 11 receives subsequently transmitted information indicative of a corrected distance or duration. Upon receiving the corrected information, the server 11 creates a circuit course centered around the landmark 512 again, and transmits the created circuit course and the corresponding distance to the member terminal for display. Then, upon receiving the OK signal, the server 11 records the created course with the corresponding distance as one of custom courses 1301 to 1303.

Thus, the present modification allows a member's desired circuit course to be selected from a plurality of circuit courses centered around a landmark desired by the member and having different paths and distances or different durations so that the selected circuit course can be recorded.

(Fifth Embodiment)

Figure 14:
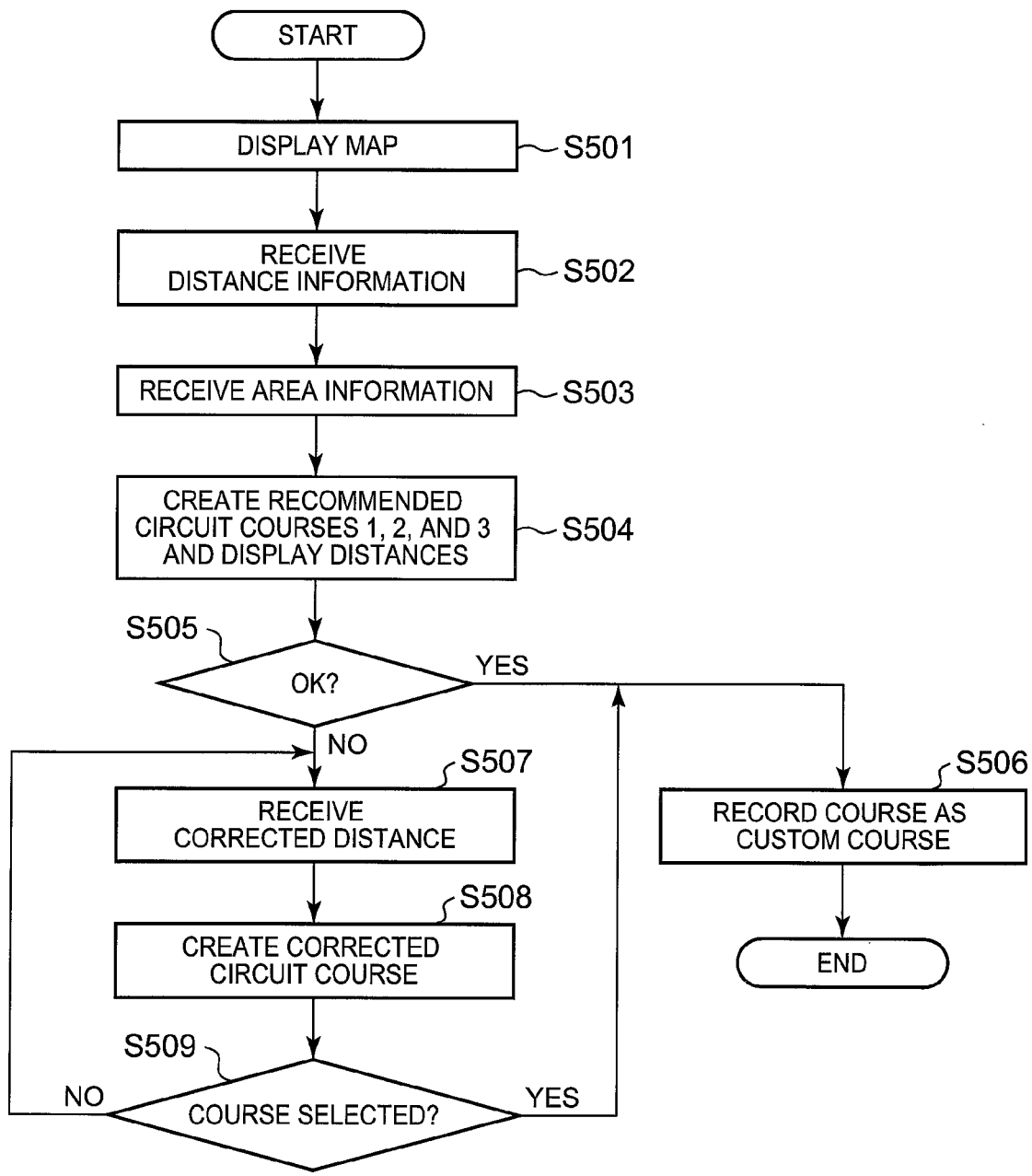
FIG. 14 is a flowchart showing a process procedure according to a fifth embodiment.

A fifth embodiment of the present invention relates to a course creation support system using the member terminal and the server 11 of the SNS 10 which are connected together via the Internet 500. FIG. 14 is a flowchart showing a process procedure of the server 11 according to the present embodiment. The server 11 transmits map data in accordance with a request from the member terminal to allow the member terminal to display a map (step S501). When the member specifies the distance (for example, 3 km) of a circuit course, the member terminal side transmits information indicative of the specified distance. The server 11 receives the information (step S502).

Figure 15:
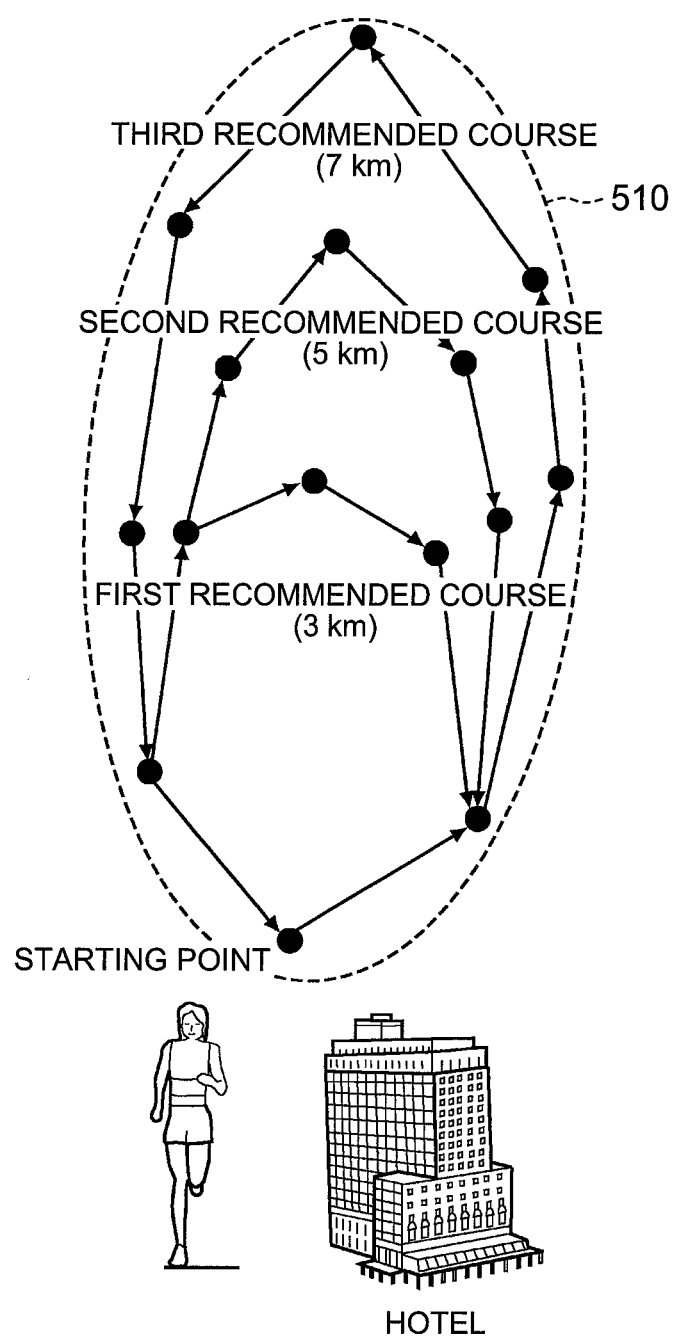
FIG. 15 is a diagram illustrating an operation according to the fifth embodiment.

Moreover, while referencing the displayed map, the member uses the closed loop 510 to specify an area in which a circuit course is to be set as shown in FIG. 15. Then, the member terminal side transmits area information indicative of the specified area. The server 11 receives the area information (step S503). FIG. 15 is a diagram conceptually showing how the course setting program 1041 of the server 11 sets a course.

The server 11 subsequently creates a plurality of circuit courses inside the closed loop 510 which are referred to as a first recommended course, a second recommended course, a third recommended course, and which include the circuit course with the specified distance. The server 11 transmits the created plurality of recommended courses and the distances to the member terminal for display (step S504). The processing in step S504 allows the first recommended circuit course to the third recommended circuit course to be displayed as shown in FIG. 15. Furthermore, the first recommended course to the third recommended course include the circuit course including the distance specified by the member (first recommended course).

Upon viewing the displayed courses and distances, the member operates the input unit 256 of the wrist terminal 2-1 to select one of the first recommended course to the third recommended course and transmit an OK signal if the member is satisfied with the selected recommended course. The server 11 determines whether or not a recommended course number and the OK signal have been received from the member wrist terminal 2-1 (step S505). If the OK signal has been received, the server 11 records the selected recommended course and the distance thereof as one of custom courses 1301 to 1303 (step S506).

If the OK signal has not been received from the wrist terminal 2-1 and the determination in step S505 is NO, the server 11 receives a subsequently transmitted corrected distance (step S507). Upon receiving the corrected distance, the server 11 creates and transmits a corrected circuit course including the corrected distance, to the member terminal for display (step S508). Then, with the corrected circuit course displayed, an operation of selecting the corrected circuit course is performed on the member terminal. A select signal is then transmitted from the wrist terminal 2-1 to the server 11, resulting in an affirmative determination in step S505. Hence, the server 11 advances the processing from step S505 to step S506 to record the selected corrected circuit course as a custom course for the member.

Thus, the present embodiment not only allows one of a plurality of recommended circuit courses including different distances to be selected and recorded as a custom course but also allows the member to specify a distance and record a desired course as a custom course if the member favors none of the plurality of recommended circuit courses. In this case, when such a closed loop as includes an illustrated hotel where the member is staying is set, a circuit course including the member's hotel can be recorded as a custom course.

(Sixth Embodiment)

Figure 16:
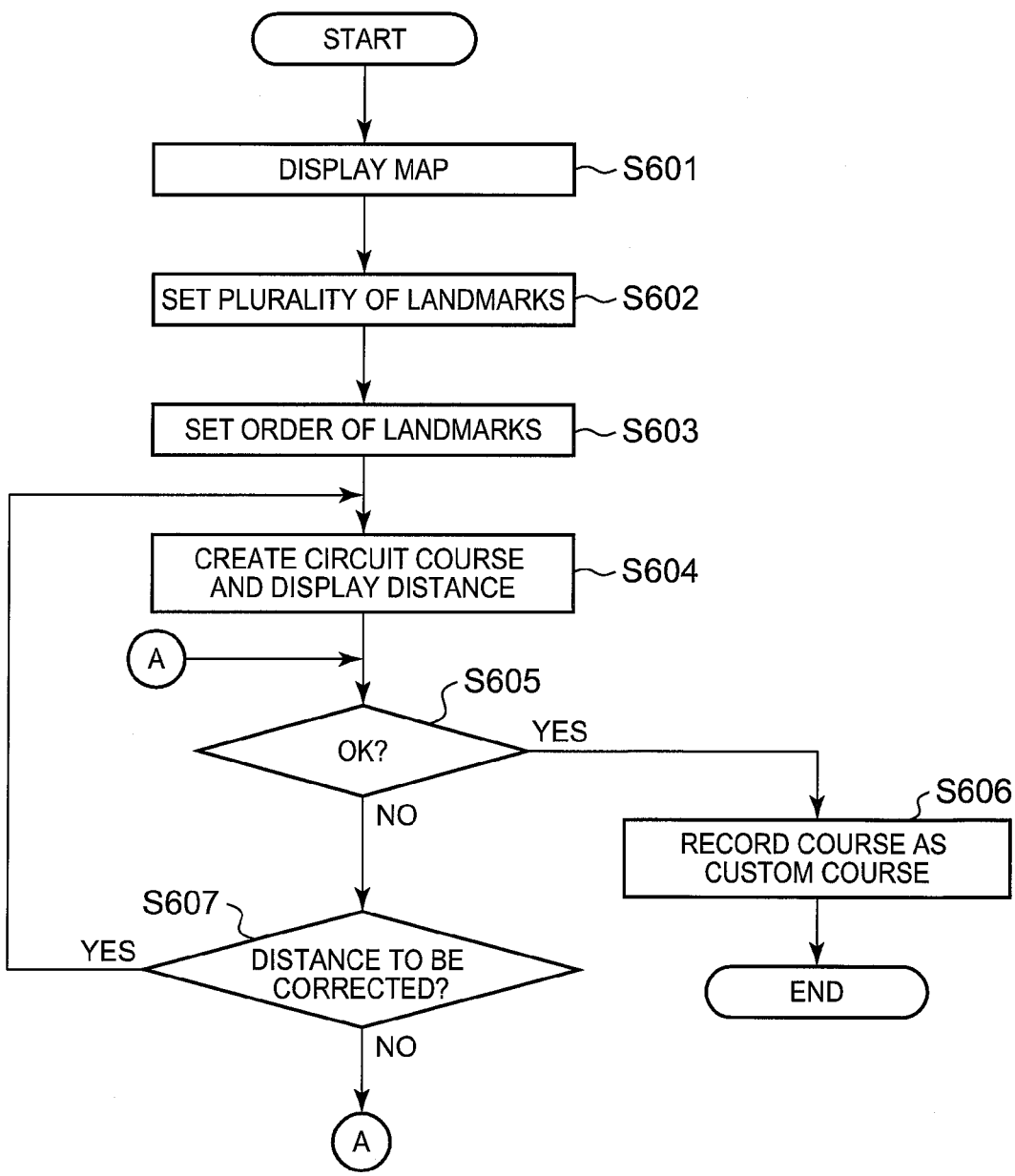
FIG. 16 is a flowchart showing a process procedure according to a sixth embodiment.
Figure 17:
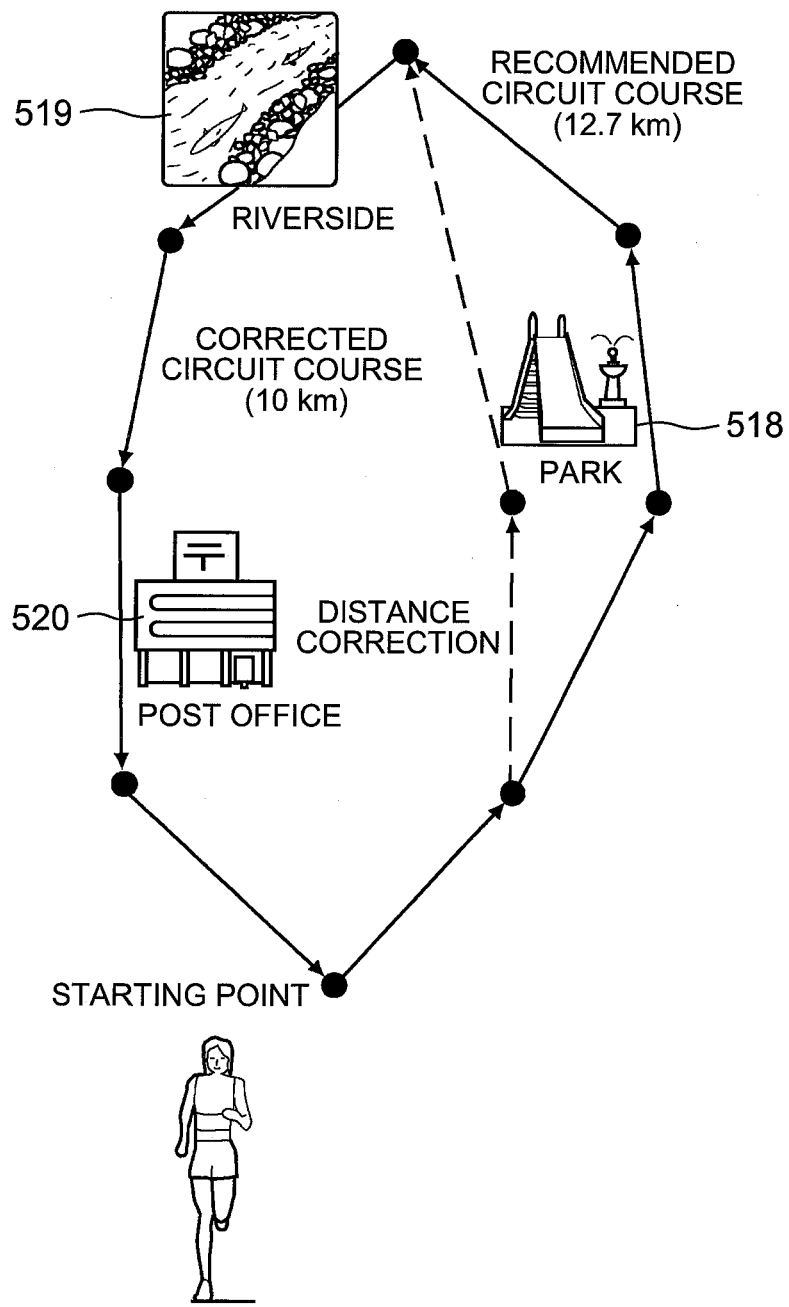
FIG. 17 is a diagram illustrating an operation according to the sixth embodiment.

A sixth embodiment of the present invention relates to a course creation support system using the member terminal and the server 11 of the SNS 10 which are connected together via the Internet 500. FIG. 16 is a flowchart showing a process procedure of the server 11 according to the present embodiment. The server 11 transmits map data in accordance with a request from the member terminal so that the member terminal can display a map (step S602). While referencing the displayed map, the member specifies a plurality of landmarks such as a park 518, a riverside 519, and a post office 520 which are to be included in a circuit course. The server 11 receives this information and sets the plurality of central landmarks (step S602). FIG. 17 is a diagram conceptually showing how the course setting program 1041 of the server 11 sets a course.

When the member further specifies the order in which the member desires to pass the specified landmarks, the server 11 receives this information and sets the order in which the member passes the specified landmarks (step S603). Thus, for example, the order of the landmarks is set as follows.

First: Park 518

Second: Riverside 519

Third: Post office 520

The server 11 subsequently creates a recommended circuit course along which the member passes the landmarks in the above-described order, and transmits the created recommended circuit course and a distance (12.7 km) to the member terminal for display (step S604). Upon viewing the displayed course and distance, the member operates the input unit 256 of the wrist terminal 2-1 to transmit an OK signal if the member is satisfied with the recommended circuit course and the distance. The server 11 determines whether or not the OK signal has been received from the member wrist terminal 2-1. If the OK signal has been received, the server 11 records the recommended circuit course with the corresponding distance as one of custom courses 1301 to 1303.

If the OK signal has not been received from the wrist terminal 2-1 and the determination in step S606 is NO, the server 11 determines whether or not information indicative of a corrected distance has been received (step S607). Upon receiving information indicative of a corrected distance, the server 11 creates a corrected circuit course having the corrected distance and along which the member passes the landmarks in the above-described order, and transmits the created corrected circuit course and distance to the member terminal for display (step S604).

Thus, according to the present embodiment, when 10 km is specified as a corrected distance as shown in FIG. 17, distance correction is carried out as shown by a dotted line in FIG. 17. Then, a corrected circuit course can be recorded which includes the distance desired by the member and which passes a plurality of landmarks desired by the member in the desired order.

(Seventh Embodiment)

Figure 18:
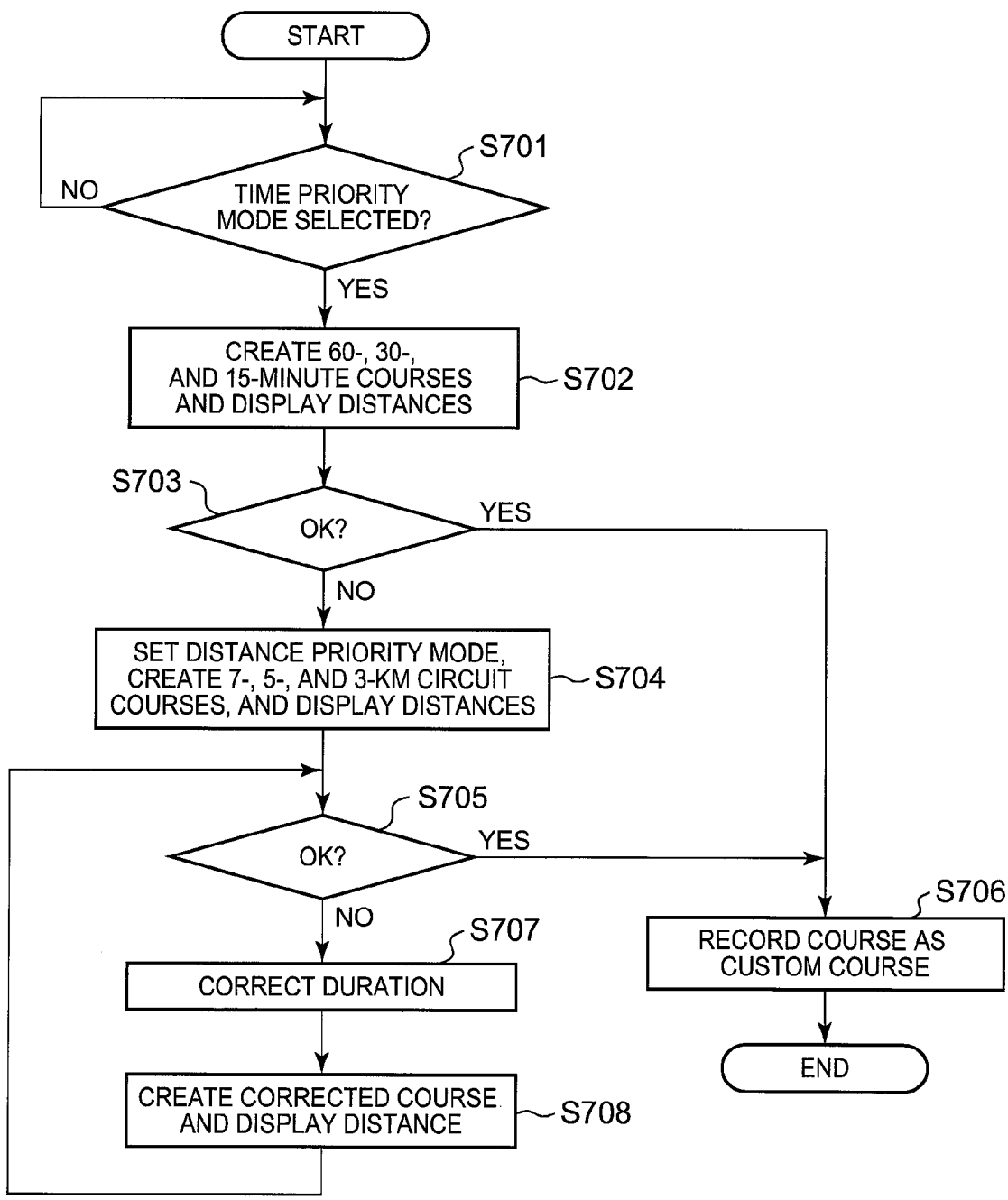
FIG. 18 is a flowchart showing a process procedure according to a seventh embodiment.
Figure 19:
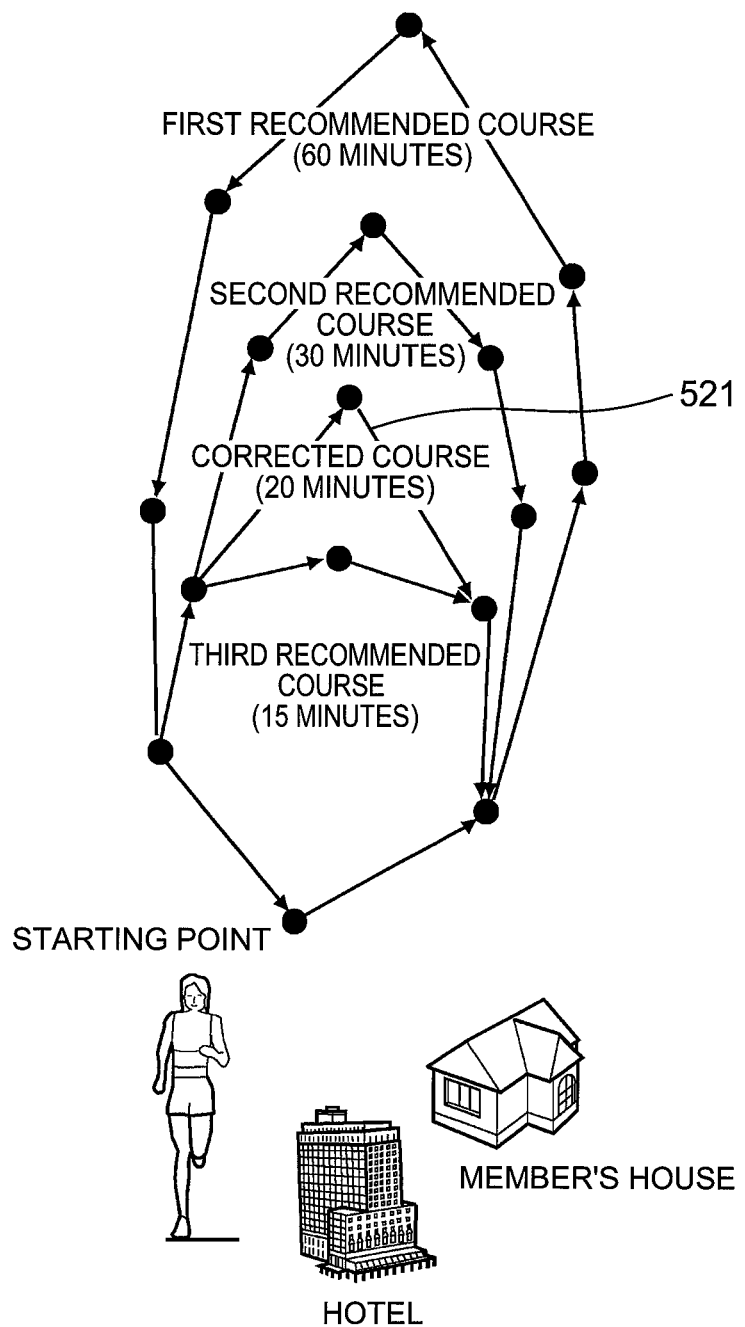
FIG. 19 is a diagram illustrating an operation according to the seventh embodiment.

A seventh embodiment of the present invention relates to a course creation support system using the member terminal and the server 11 of the SNS 10 which are connected together via the Internet 500. FIG. 18 is a flowchart showing a process procedure of the server 11 according to the present embodiment. The server 11 determines whether or not a time priority mode has been selected (step S701). When the member operates the member terminal to select the time priority mode, information indicating that the time priority mode has been selected is transmitted to the server 11, which then determines that the time priority mode has been selected (step S701: YES). Thus, the server 11 advances the processing from step S701 to step S702 to create a 60-minute course, a 30-minute course, and a 15-minute course, and transmits the created plurality of circuit courses and the corresponding distances to the member terminal for display (step S702). The processing in step S702 allows display of a first recommended circuit course (60-minute course), a second recommended circuit course (30-minute course), and a third recommended circuit course (15-minute course) as shown in FIG. 19. FIG. 19 is a diagram conceptually showing how the course setting program 1041 of the server 11 sets a course.

In this process, a starting point may be pre-specified. In this case, a first recommended course to a third recommended course having the member's house or hotel as a starting point are created and displayed.

Upon viewing the displayed courses and distances, the member operates the member terminal to select one of the first recommended course to the third recommended course and transmit an OK signal if the member is satisfied with the selected recommended course. The server 11 determines whether or not a recommended course number and the OK signal have been received from the member wrist terminal 2-1 (step S703). If the OK signal has been received, the server 11 records the selected recommended course and the distance thereof as one of custom courses 1301 to 1303 (step S706).

If the OK signal has not been received from the wrist terminal 2-1 and the determination in step S703 is NO, the server 11 automatically sets a distance priority mode instead of the time priority mode, creates a 7-, a 5-, and a 3-km course, and transmits the created plurality of circuit courses and the corresponding distances to the member terminal for display (step S704). Upon viewing the displayed courses and distances, the member operates the member terminal to select any of the recommended courses and transmit an OK signal if the member is satisfied with the selected recommended course. The server 11 determines whether or not a recommended course number and the OK signal have been received from the member wrist terminal 2-1 (step S705). If the OK signal has been received, the server 11 records the selected course and the distance thereof as one of custom courses 1301 to 1303 (step S706).

If the OK signal has not been received from the wrist terminal 2-1 and the determination in step S705 is NO, the server 11 corrects the duration based on correction information subsequently transmitted by the member terminal (step S707). The server 11 then creates a corrected course including the corrected duration, and transmits the corrected course to the member terminal along with the duration of the course for display (step S708).

Thus, if the member favors none of the first recommended course (60-minute course), the second recommended course (30-minute course), and the third recommended course (15-minute course) and corrects the duration to 20 minutes, a corrected course 521 (20-minute course) that is different from the first recommended course (60-minute course), the second recommended course (30-minute course), and the third recommended course (15-minute course) is created and displayed, as shown in FIG. 19. Then, when the member selects the corrected course 521 (20-minute course) and performs an OK operation, the corrected course 521 (20-minute course) is recorded as a custom course.

Thus, according to the present embodiment, a plurality of courses with different durations are created in the time priority mode and a plurality of courses with different distances are created in the distance priority mode, so that the desired one of these courses can be recorded as a custom course. Moreover, a course with a duration desired by the member may be automatically created.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. A course creation support apparatus comprising:
   a transmitter configured to transmit, via a network, map information of a map to a terminal;
   a receiver configured to receive, via the network, landmark information indicative of a landmark on the map from the terminal; and
   a processor configured to create a circuit course that defines a path which is traversable by a user in a looping manner based on the received landmark information so that the circuit course does not include the landmark thereon and the landmark is positioned inside the circuit course,
   wherein the transmitter is configured to transmit the circuit course to the terminal via the network;

the receiver is configured to receive, via the network, correction information for correcting the created circuit course from the terminal;

the processor is configured to create a corrected circuit course by correcting the circuit course based on the received correction information; and the transmitter is configured to transmit the corrected circuit course to the terminal via the network.

2. The course creation support apparatus according to claim 1, wherein:

the receiver is configured to receive, via the network, distance information indicative of a distance of the path of the circuit course for the user to traverse, from the terminal;

the processor is configured to create the circuit course based further on the received distance information;

the transmitter is configured to transmit the circuit course to the terminal via the network;

the receiver is configured to receive, as the correction information, corrected distance information created by correcting the distance information; and the processor is configured to create the corrected circuit course based on the received corrected distance information so that the user can traverse the path of the corrected circuit course.

3. The course creation support apparatus according to claim 1, wherein:

the receiver is configured to receive, via the network, duration information indicative of a duration of time required for the user to traverse the path from the terminal; and the processor is configured to create the circuit course based further on the received duration information;

the transmitter is configured to transmit the circuit course to the terminal via the network;

the receiver is configured to receive, as the correction information, corrected duration information created by correcting the duration information; and the processor is configured to create the corrected circuit course based on the received corrected duration information so that the user can traverse the path of the corrected circuit course.

4. The course creation support apparatus according to claim 1, further comprising a memory, wherein the processor is configured to record the corrected circuit course in the memory.

5. The course creation support apparatus according to claim 1, wherein the transmitter transmits the corrected circuit course to the terminal for display on a display of the terminal.

6. The course creation support apparatus according to claim 1, wherein:

the receiver is configured to receive, via the network, area information indicative of an area on the map from the terminal; and the processor is configured to create the circuit course that defines the path which is traversable by the user within the area indicated by the area information;

the transmitter is configured to transmit the circuit course to the terminal via the network;

the receiver is configured to receive, as the correction information, corrected area information that has been created by correcting the area information indicative of the area and that is indicative of a corrected area; and the processor is configured to create the corrected circuit course so that the user is able to traverse the path within the corrected area indicated by the corrected area information.

7. A non-transitory computer-readable storage medium having stored thereon a computer program which is executable by a computer to cause the computer to perform functions comprising:

transmitting, via a network, map information of a map to a terminal;

receiving, via the network, landmark information indicative of a landmark on the map from the terminal;

creating a circuit course that defines a path which is traversable by a user in a looping manner based on the received landmark information in a looping manner so that the circuit course does not include the landmark thereon and the landmark is positioned inside the circuit course;

transmitting the circuit course to the terminal via the network;

receiving correction information for correcting the circuit course from the terminal via the network;

creating a corrected circuit course by correcting the circuit course based on the received correction information; and transmitting the corrected circuit course to the terminal via the network.

8. A course creation support method for a course creation support apparatus comprising a transmitter, a receiver, and a processor, the method comprising:

transmitting, with the transmitter, map information of a map to a terminal via a network;

receiving, with the receiver, landmark information indicative of a landmark on the map from the terminal, via the network;

creating, with the processor, a circuit course that defines a path which is traversable by a user in a looping manner based on the received landmark information in a looping manner so that the circuit course does not include the landmark thereon and the landmark is positioned inside the circuit course;

transmitting, with the transmitter, the circuit course to the terminal via the network;

receiving, with the receiver, correction information for correcting the circuit course from the terminal via the network;

creating, with the processor, a corrected circuit course by correcting the circuit course based on the received corrected information; and transmitting, with the transmitter, the corrected circuit course to the terminal via the network.

9. A course creation support system comprising a terminal and a server connected to the terminal via a network, wherein the terminal comprises:

a terminal receiver configured to receive, via the network, map information indicative of a map, from the server;

a terminal processor configured to specify landmark information indicative of a landmark on the map; and a terminal transmitter configured to transmit, via the network, the landmark information, to the server;

wherein the server comprises:

a server transmitter configured to transmit, via the network, the map information of the map to the terminal;

a server receiver configured to receive, via the network, the landmark information transmitted from the terminal; and a server processor configured to create a circuit course that defines a path which is traversable by a user of the terminal in a looping manner based on the landmark information received by the server receiver in a looping manner so that the circuit course does not include the landmark thereon and the landmark is positioned inside the circuit course;

wherein:

the server transmitter is configured to transmit, via the network, the circuit course created by the server processor to the terminal;

the terminal receiver is configured to receive the circuit course from the server;

the terminal processor is configured to create correction information for correcting the circuit course;

the terminal transmitter is configured to transmit the correction information to the server via the network;

the server receiver is configured to receive the correction information for correcting the circuit course from the terminal;

the server processor is configured to create a corrected circuit course by correcting the circuit course based on the received correction information; and the server transmitter is configured to transmit the corrected circuit course to the terminal via the network.

10. The course creation support system according to claim 9, wherein the server further comprises a server memory configured to record the corrected circuit course created by the server processor.

11. The course creation support system according to claim 9, wherein the terminal further comprises a terminal memory configured to record the corrected circuit course received from the server.

12. The course creation support system according to claim 9, wherein the terminal further comprises a display configured to display the corrected circuit course received from the server.

13. The course creation support apparatus according to claim 2,
wherein the processor creates the corrected circuit course based on the received corrected distance information, and
wherein the corrected circuit course includes the same path which is to be traversed a plurality of times, or includes a turn.

14. The course creation support apparatus according to claim 3,
wherein the processor creates the corrected circuit course based on the received corrected duration information, and
wherein the corrected circuit course includes the same path which is to be traversed a plurality of times, or includes a turn.

* * * * *